United States Patent
Chaudhary et al.

(10) Patent No.: US 10,957,115 B2
(45) Date of Patent: Mar. 23, 2021

(54) WEARABLE ITEM VISUALIZER

(71) Applicant: Trendage, Inc., Santa Clara, CA (US)

(72) Inventors: Vineet Chaudhary, Milpitas, CA (US); Ernest Woei, San Jose, CA (US)

(73) Assignee: Trendage, Inc., Santa Clara, CA (US)

( * ) Notice: Subject to any disclaimer, the term of this patent is extended or adjusted under 35 U.S.C. 154(b) by 0 days.

(21) Appl. No.: 15/642,322

(22) Filed: Jul. 5, 2017

(65) Prior Publication Data
US 2019/0012842 A1 Jan. 10, 2019

(51) Int. Cl.
| | |
|---|---|
| *G06T 19/20* | (2011.01) |
| *G06F 3/0482* | (2013.01) |
| *G06F 3/0484* | (2013.01) |
| *G06T 17/20* | (2006.01) |
| *G06T 15/04* | (2011.01) |

(52) U.S. Cl.
CPC ............ *G06T 19/20* (2013.01); *G06F 3/0482* (2013.01); *G06F 3/04845* (2013.01); *G06T 17/205* (2013.01); *G06T 15/04* (2013.01); *G06T 2219/2004* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 5,850,222 A | * | 12/1998 | Cone | G06T 17/20 345/418 |
| 6,476,804 B1 | * | 11/2002 | Costabel | G06T 13/20 345/419 |
| 2001/0019332 A1 | * | 9/2001 | Fisher | G06Q 30/0641 345/582 |
| 2008/0163344 A1 | * | 7/2008 | Yang | G06Q 30/0201 726/4 |
| 2008/0255920 A1 | * | 10/2008 | Vandergrift | G06Q 30/06 700/132 |
| 2009/0044113 A1 | * | 2/2009 | Jones | G06T 13/40 715/707 |
| 2014/0168217 A1 | * | 6/2014 | Kim | G06T 13/40 345/420 |
| 2014/0188670 A1 | * | 7/2014 | Ajala | G06Q 30/0643 705/27.2 |
| 2015/0193975 A1 | * | 7/2015 | Corazza | G06T 17/20 345/420 |
| 2016/0088284 A1 | * | 3/2016 | Sareen | G06N 3/006 348/47 |
| 2016/0180391 A1 | * | 6/2016 | Zabaneh | G06F 16/9535 705/14.58 |
| 2017/0039775 A1 | * | 2/2017 | Applegate | G06T 7/30 |
| 2017/0046769 A1 | * | 2/2017 | Jackson | G06Q 30/0643 |
| 2017/0323476 A1 | * | 11/2017 | Black | G06T 17/00 |
| 2018/0012420 A1 | * | 1/2018 | Ngo Ngoc | G06F 17/50 |

\* cited by examiner

*Primary Examiner* — Steven Z Elbinger (57) ABSTRACT

Visualizing a wearable item can include: generating a user interface that enables a user to choose a target body for visualizing a wearable item from among a set of available target bodies; and generating a visualization of the wearable item on the target body chosen by the user by deforming the wearable item to fit the target body chosen by the user.

16 Claims, 11 Drawing Sheets

FIG. 11

WEARABLE ITEM VISUALIZER

BACKGROUND

A wearable item can be visualized using pictures. For example, a clothing item such as a dress, a shirt, pants, etc., can be visualized in a catalog using a picture of the clothing item being worn by a model.

A picture of a wearable item on a model may not provide an optimal visualization of the wearable item. For example, a potential purchaser of a clothing item may wonder how the clothing item would look on a different body type from the body type of the model.

SUMMARY

In general, in one aspect, the invention relates to a wearable item visualizer. The wearable item visualizer can include: a user interface that enables a user to choose a target body for visualizing a wearable item from among a set of available target bodies; and an image adapter for generating a visualization of the wearable item on the target body chosen by the user by deforming the wearable item to fit the target body chosen by the user.

In general, in another aspect, the invention relates to a method for visualizing a wearable item. The method can include: generating a user interface that enables a user to choose a target body for visualizing a wearable item from among a set of available target bodies; and generating a visualization of the wearable item on the target body chosen by the user by deforming the wearable item to fit the target body chosen by the user.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

Figure 1:
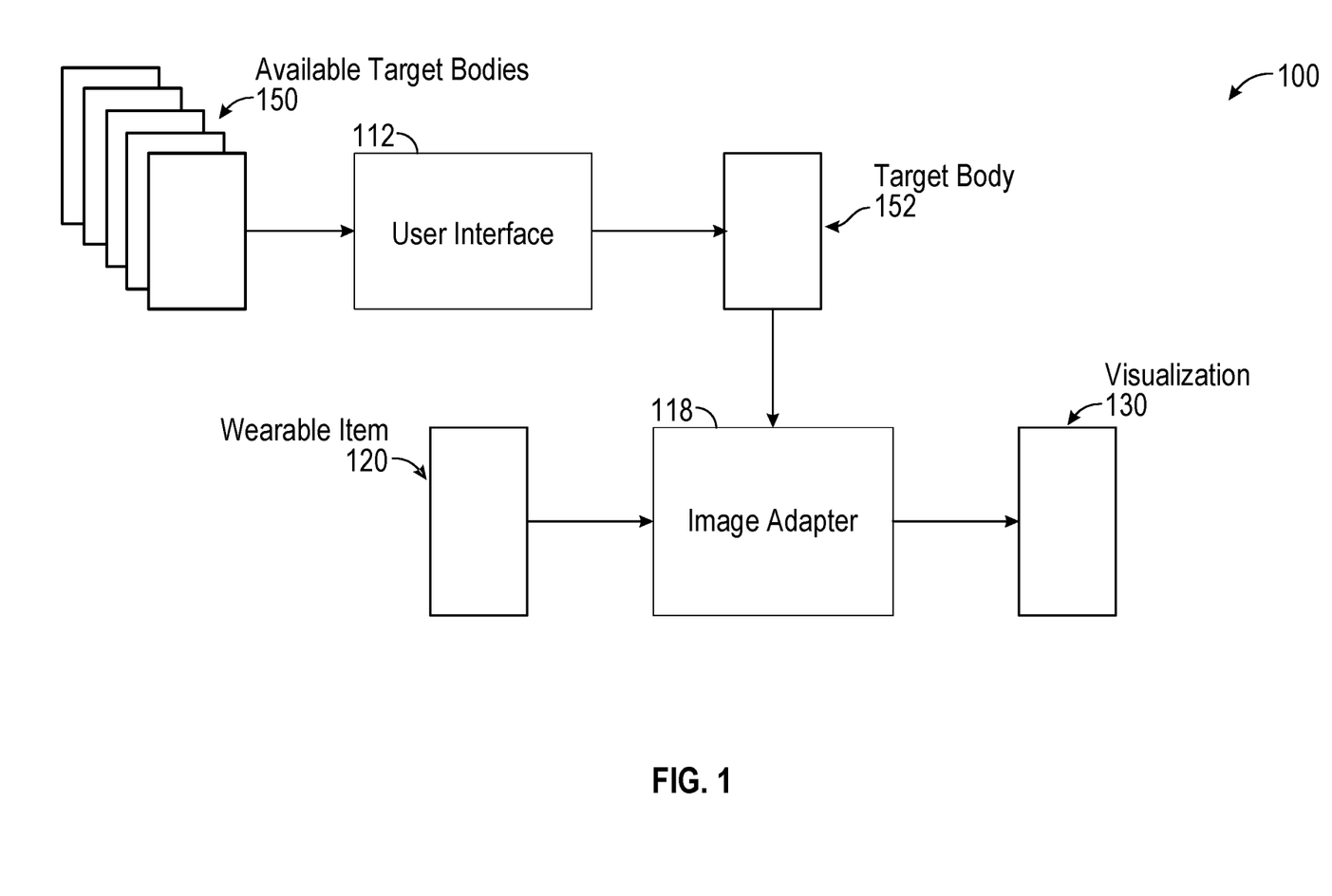
FIG. 1 illustrates a wearable item visualizer in one or more embodiments.

FIG. 1 illustrates a wearable item visualizer 100 in one or more embodiments. The wearable item visualizer 100 generates a visualization 130 of a wearable item 120 on a target body 152 chosen by a user from among a set of available target bodies 150.

The wearable item 120 can be any wearable item. For example, the wearable item 120 can be a wearable item for a human body and the available target bodies 150 can include a variety of human body types. In another example, the wearable item 120 can be a wearable item for an animal body and the available target bodies 150 can depict a variety of animals. In yet another example, the wearable item 120 can be a wearable item for an inanimate object, e.g., an advertisement for a vehicle, décor for a piece of furniture, etc., and the available target bodies 150 can depict an assortment of pertinent inanimate objects.

The wearable item visualizer 100 includes a user interface 112 that enables a user to choose the target body 152 for visualizing the wearable item 120 from among the available target bodies 150. For example, the user interface 112 can enable a user to browse the available target bodies 150 on a computing device, e.g., a computer, smartphone, tablet, etc., and select the target body 152 via their computing device.

The wearable item visualizer 100 includes an image adapter 118 for generating the visualization 130 of the wearable item 120 on the target body 152 by deforming the wearable item 120 to fit the target body 152. In one or more embodiments, the image adapter 118 deforms the wearable item 120 by generating a triangle mesh for the wearable item 120 and deforming the triangle mesh to fit the target body 152. The image adapter 118 can restore an internal geometry of the triangle mesh after deformation to an internal geometry of the triangle mesh before deformation, and then transfer a set of image data for the wearable item 120 to the restored triangle mesh.

In one or more embodiments, the image adapter 118 deforms the wearable item 120 in response to a set of landmarks for the wearable item 120 and a set of landmarks for the target body 152. The landmarks for the wearable item 120 and the landmarks for the target body 152 can be derived from a set of landmarks of a reference body upon which the wearable item 120 and the target body 152 are based.

Figure 2:
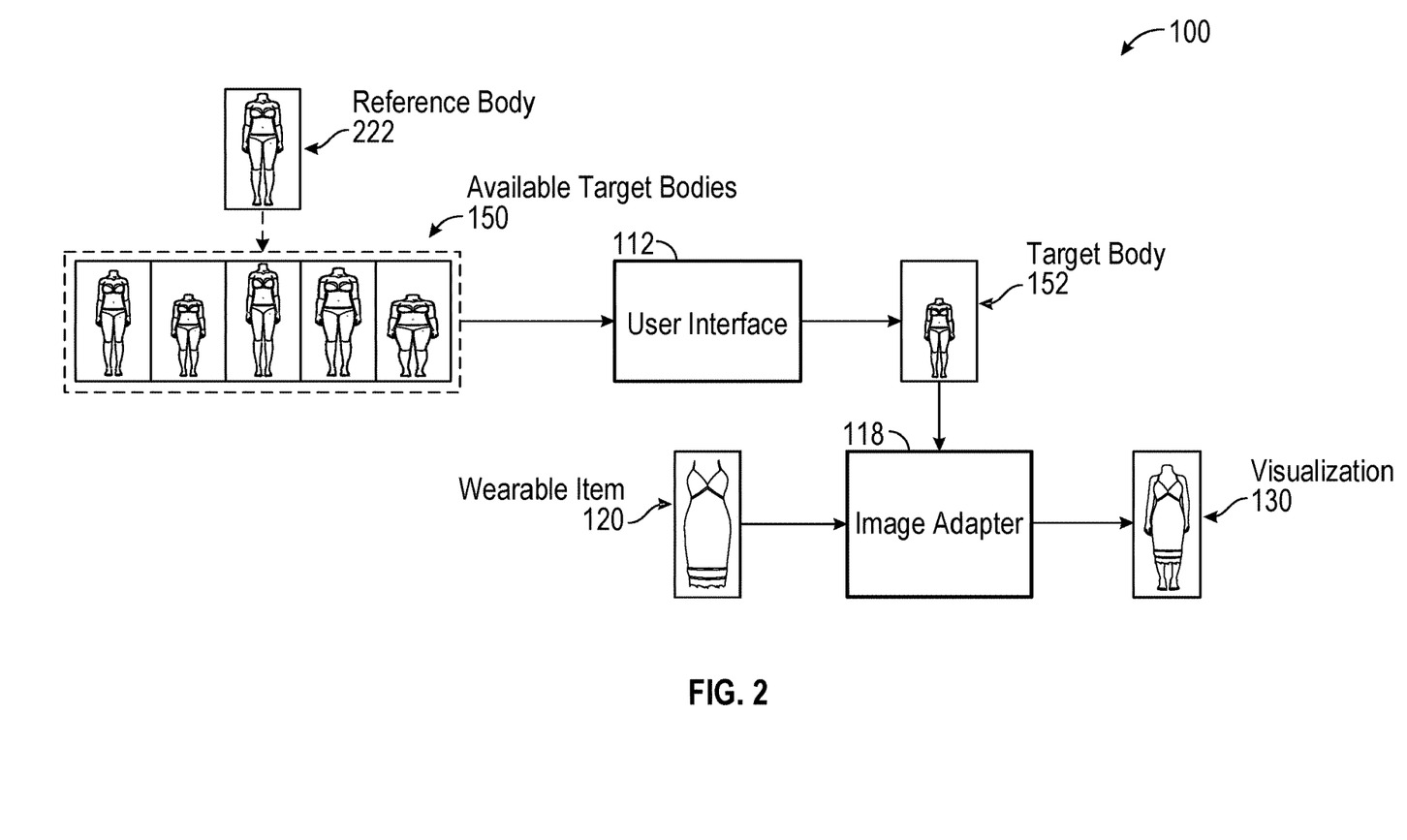
FIG. 2 illustrates an embodiment of a wearable item visualizer adapted for visualizing wearable items on a human body.

FIG. 2 illustrates an embodiment of the wearable item visualizer 100 in which the wearable item 120 is a clothing item for a human body. The wearable item 120 in this embodiment is adapted to be worn on a reference body 222. The wearable item 120 can be adapted to the reference body 222 by manually positioning the wearable item 120 on the reference body 222 and manipulating the shape of the wearable item 120 for an aesthetically pleasing look on the reference body 222.

The available target bodies 150 in this embodiment are variations of the reference body 222. For example, the available target bodies 150 can differ from the reference body 222 in height, length of legs, length or arms, widths of legs, widths of arms, size of head, width of hips, thickness of neck, width of shoulders, etc. In one or more embodiments, the available target bodies 150 provide a user with hundreds of alternative body types for visualizing the wearable item 120.

Figure 3:
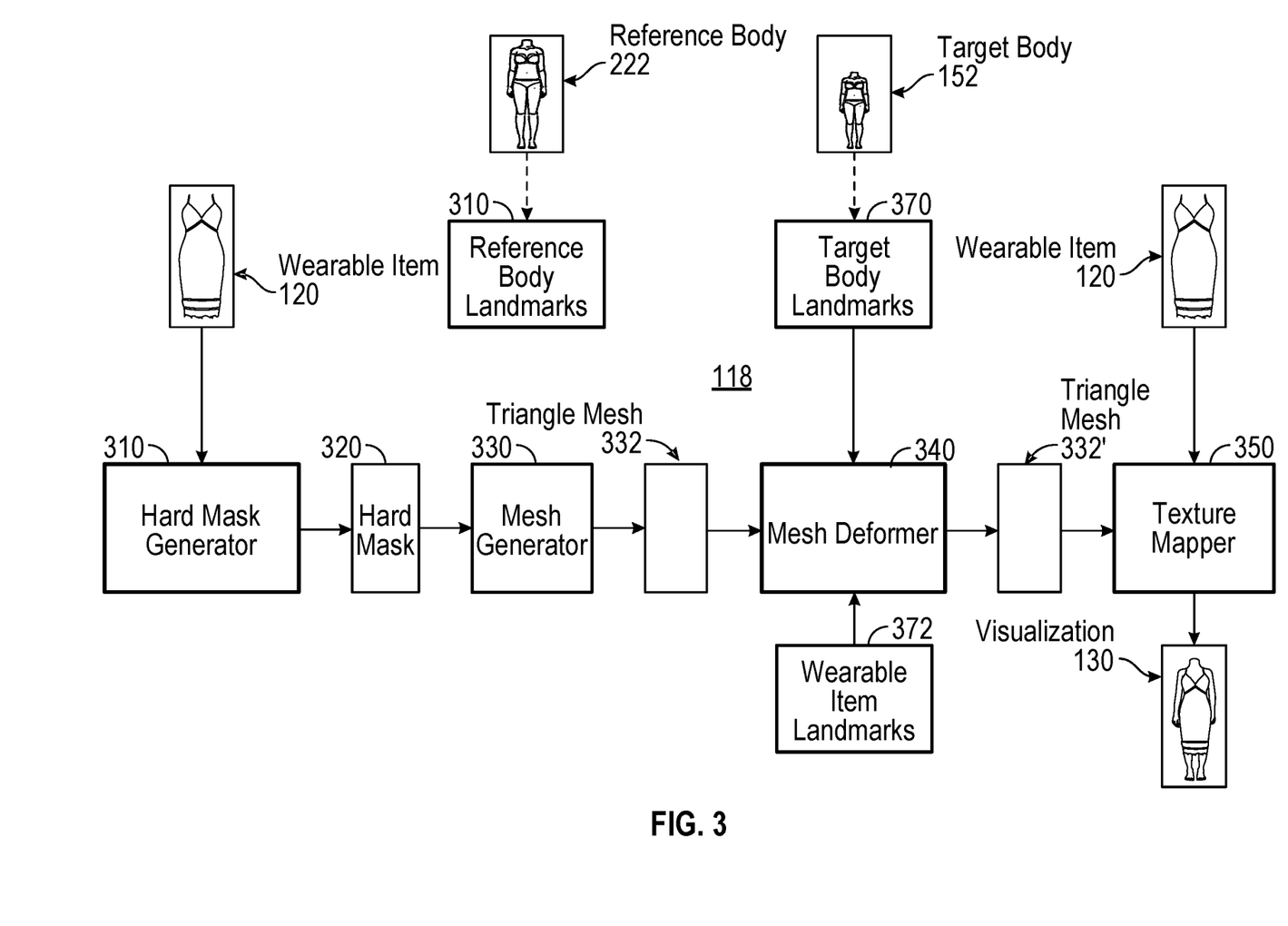
FIG. 3 illustrates how a wearable item visualizer can deform a wearable item to fit a target body selected by a user in one or more embodiments.

FIG. 3 shows how the image adapter 118 generates the visualization 130 in one or more embodiments. The image adapter 118 includes a hard mask generator 310 that generates a hard mask 320 for the wearable item 120.

In one or more embodiments, the hard mask generator 310 generates the hard mask 320 from the alpha data in the wearable item 120 when the wearable item 120 is manually positioned on the reference body 222 for aesthetic appeal. In one or more embodiments, the hard mask generator 310 performs a morphological reconstruction on the hard mask 320 to fill any holes in the hard mask alpha data. The filled holes in the hard mask 320 can reduce the number of triangles during subsequent triangulation of the hole-less hard mask (HLHM) 320, and minimize the management of separate regions during later texture mapping.

The image adapter 118 includes a mesh generator 330 that generates a triangle mesh 332 in response to the hard mask 320. In one or more embodiments, the mesh generator 330 generates the triangle mesh 332 according to a Shewchuk Delaunay refinement method for triangle mesh generation. The triangulation can be based on triangle vertices data and vertices coordinate data. Adjustments can be made to the triangle vertices data and vertices coordinate data to fit the image coordinates of the hard mask 320. In one or more embodiments, vertices sequences for connected sets of triangles in the triangle mesh 332 are saved for subsequent validation of texture mapping.

The image adapter 118 includes a mesh deformer 340 that deforms the triangle mesh 332 that fits the reference body 222 to a triangle mesh 332' that fits the target body 152. In one or more embodiments, the mesh deformer 340 deforms the triangle mesh 332 in response to a set of wearable item landmarks 372 and a set of target body landmarks 370.

The wearable item landmarks 372 in one or more embodiments are based on a corresponding set of reference body landmarks 380. The reference body landmarks 380 specify a respective location of each of a set of preselected features of the reference body 222 as well as contour points on a body outline of the reference body 222. For example, the preselected features of the reference body 222 can include the clavicles, armpits, elbows, wrists, ankles, underwear, etc., of the reference body 222. The wearable item landmarks 372 specify a respective location on the wearable item 120 of one or more of the preselected features of the reference body 222 when the wearable item 120 is manually positioned on the reference body 222 for aesthetic appeal.

The target body landmarks 370 are based on the same preselected features upon which the reference body landmarks 380 are based, e.g., the clavicles, armpits, elbows, wrists, ankles, underwear, etc., of the target body 152, as well as contour points on a body outline of the target body 152.

In one or more embodiments, the mesh deformer 340 uses a moving least squares (MLS) process to generate the triangle mesh 332' from the triangle mesh 332. The mesh deformer 340 can perform an MLS determination with the wearable item landmarks 372 as initial control points and the target body landmarks 370 as final control points.

In one or more embodiments, the mesh deformer 340 uses an as-rigid-as-possible (ARAP) process to correct the internal triangle geometry of the triangle mesh 332' to the internal triangle geometry the triangle mesh 332. In one or more embodiments, the boundary points of the triangle mesh 332' are clamped down before performing the ARAP process to minimize the occurrences of mesh twisting.

The image adapter 118 includes a texture mapper 350 that transfers image data from the wearable item 120, which corresponds to the triangle mesh 332, to the triangle mesh 332' for the visualization 130. The texture mapper 350 performs a triangle to triangle mapping. For triangle to triangle mappings requiring contraction, the texture mapper 350 subsamples the domain space into the range space. For triangle to triangle mappings requiring expansion, the texture mapper 350 maps everything from the domain space into the range space, and then fills the unfilled pixels. The texture mapping can be validated using the boundary data sequences sets obtained by the mesh generator 330.

Figure 4:
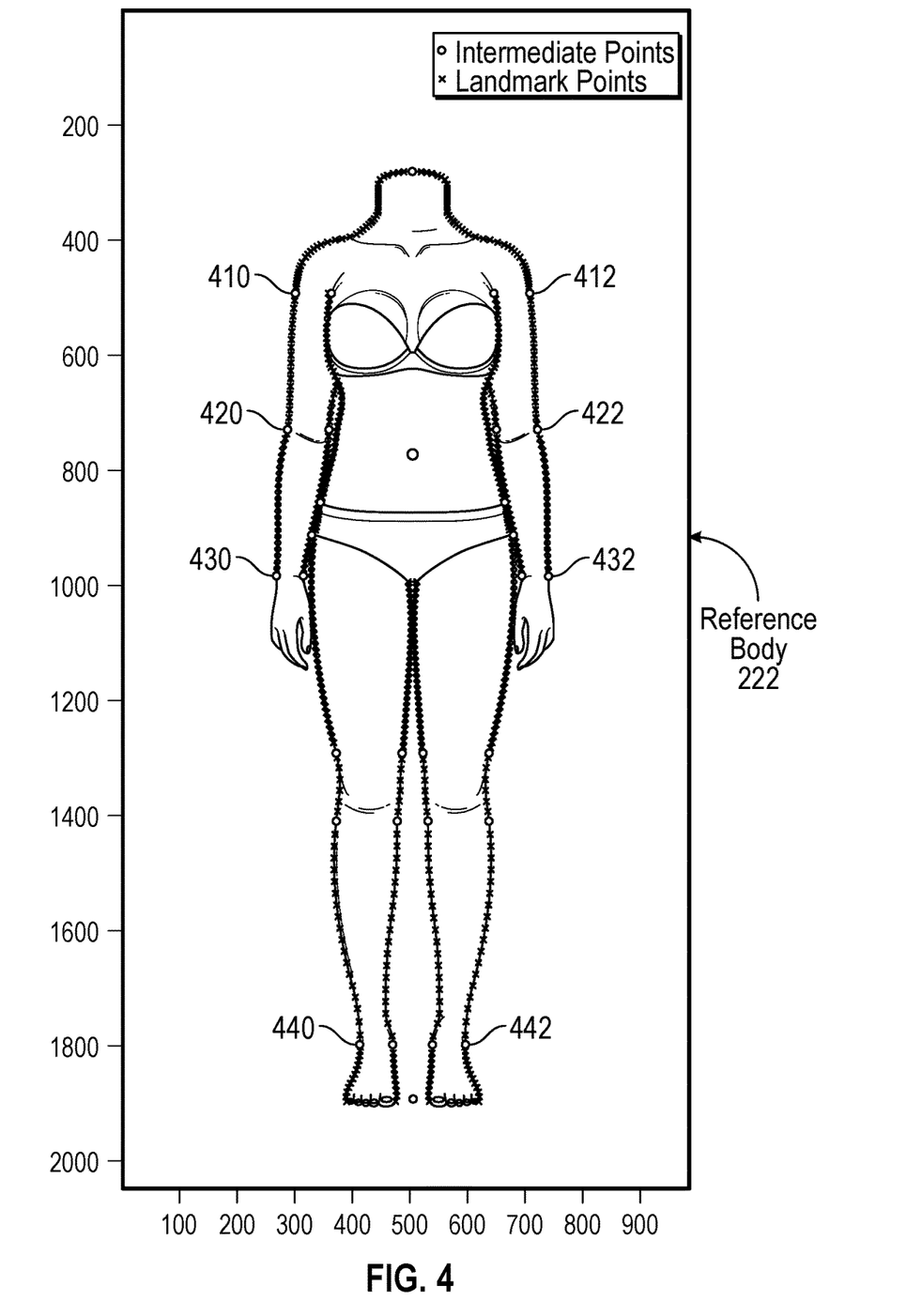
FIG. 4 illustrates a set of reference body landmarks in one or more embodiments.

FIG. 4 illustrates the reference body landmarks 380 in one or more embodiments. In this example, the reference body 222 is contained in a 2048×984 array of pixels. In this example, the features upon which the reference body landmarks 380 are based include a top and a bottom the reference body 222, armpits, elbows, top and bottom of underwear, wrists, top and bottom of knees, and ankles.

The reference body landmarks 380 can be obtained by determining an outline of the reference body 222 and then manually choosing a set of horizontal line levels such that the horizontal lines align with an exterior part of the reference body 222 at the preselected features of the reference body 222. For example, this yields a pair of landmarks 410 at the right armpit, a pair of landmarks 412 at the left armpit, a pair of landmarks 420 at the right elbow, a pair of landmarks 422 at the left elbow, a pair of landmarks 430 at the right wrist, a pair of landmarks 432 at the left wrist, a pair of landmarks 440 at the right ankle, and a pair of landmarks 432 at the left ankle.

The outline of the reference body 222 can be determined by generating a binary mask of the reference body 222 based on the alpha channel of the 2048×984 array of pixels of the reference body 222, and applying a Moore Neighborhood method with Jacob's stopping criteria to obtain the boundary of the reference body 222. In an alternative to an alpha channel mask, the boundary of the reference body 222 can be based on body color data by taking non-zero alpha values or non-background colors, respectively, and setting those pixels as 1 in the binary mask.

Figure 5:
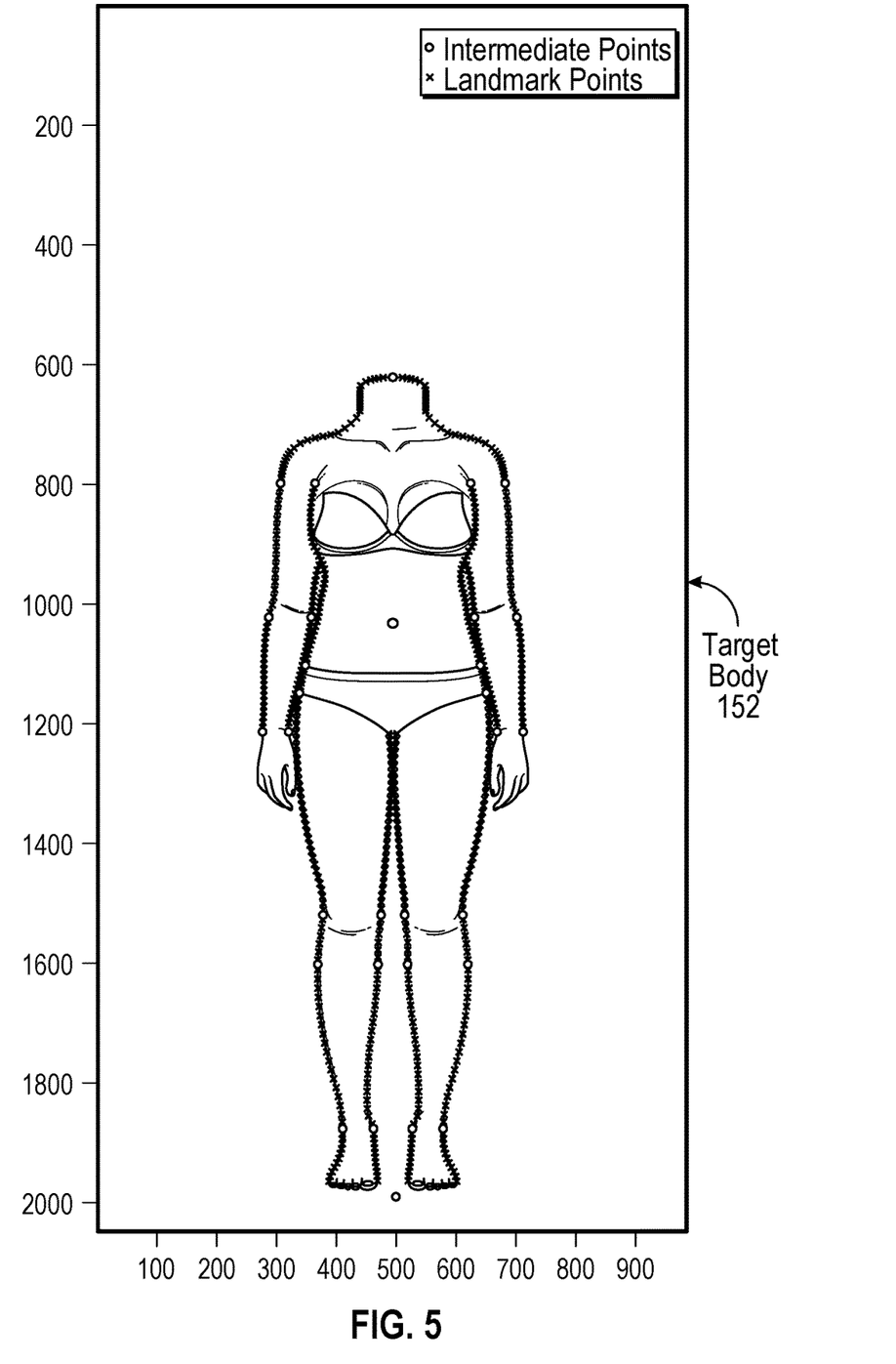
FIG. 5 illustrates a set of target body landmarks in one or more embodiments.

FIG. 5 illustrates the target body landmarks 370 of the target body 152 chosen by a user in one or more embodiments. The target body landmarks 370 can be obtained by determining an outline of the target body 152 and then manually choosing a set of horizontal line levels such that the horizontal lines align with an exterior part of the target body 152 at the preselected features of the reference body 222.

Figure 6A:
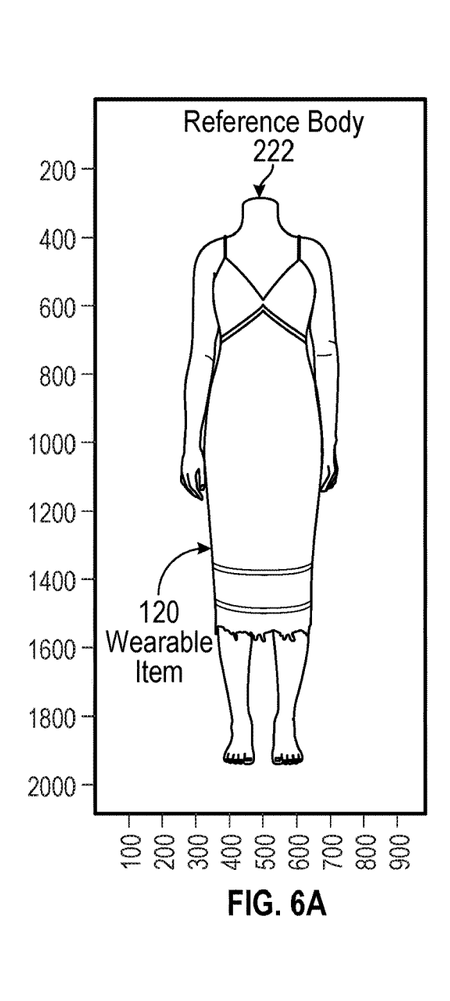
FIG. 6A illustrates a wearable item adapted for a reference body in an example embodiment.

FIG. 6A shows the wearable item 120 positioned on the reference body 222 in 2048×984 array of pixels in an example embodiment. The wearable item 120 is manually adapted to fit the reference body 222 and obtain the wearable item landmarks 372 based on the coordinates of the reference body landmarks 380 that overlap the wearable item 120.

The image data in the 2048×984 array includes image data pertaining to the wearable item 120 and alpha data. Transparency is removed from the wearable item 120 for any regions where there are gaps in reference body 222 but no gaps in target body 152. The removal of transparency can ensure that deformation from gapped regions to non-gapped regions results in no gap in the wearable item 120.

Figures 6B, 6C:
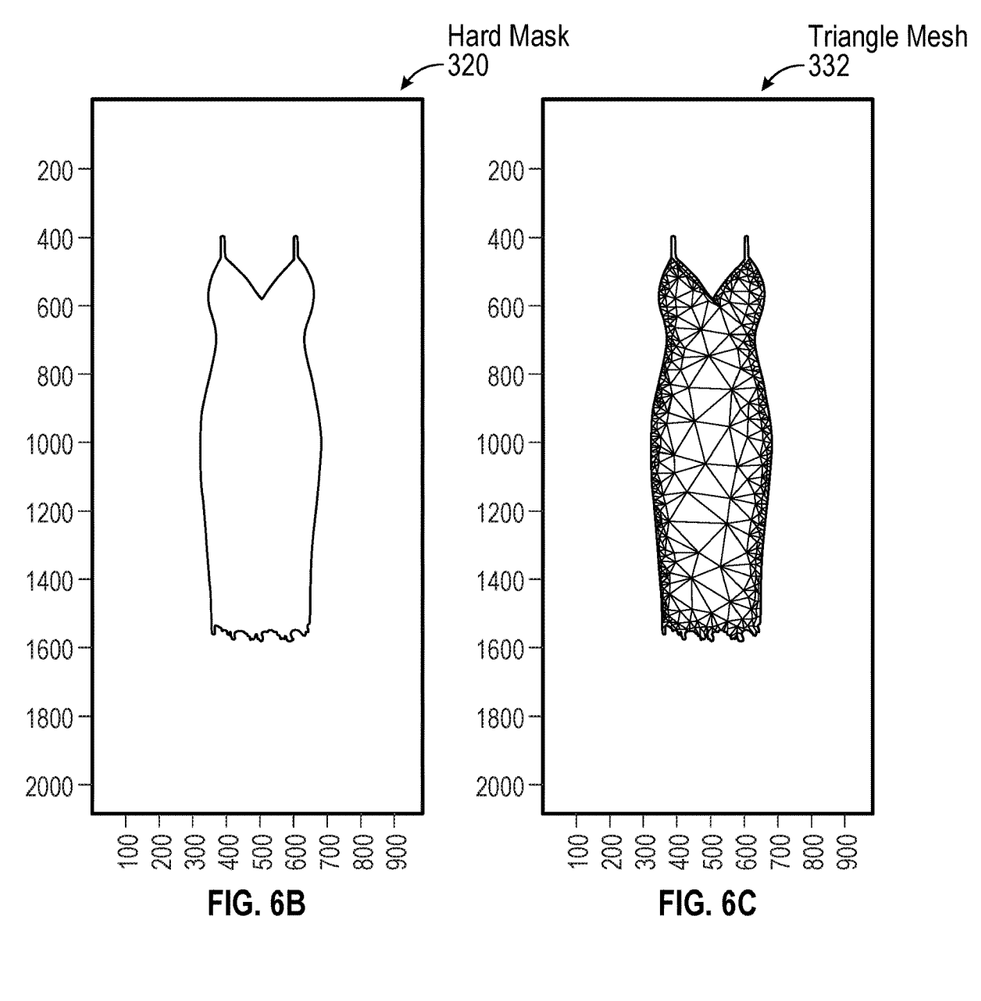
FIG. 6B illustrates a hard mask derived from a wearable item in an example embodiment.
FIG. 6C illustrates a triangle mesh derived from a hard mask in an example embodiment.

FIG. 6B shows the hard mask 320 derived from the wearable item 120 shown in FIG. 6A. FIG. 6C shows the triangle mesh 332 derived from the hard mask 400.

Figure 7A:
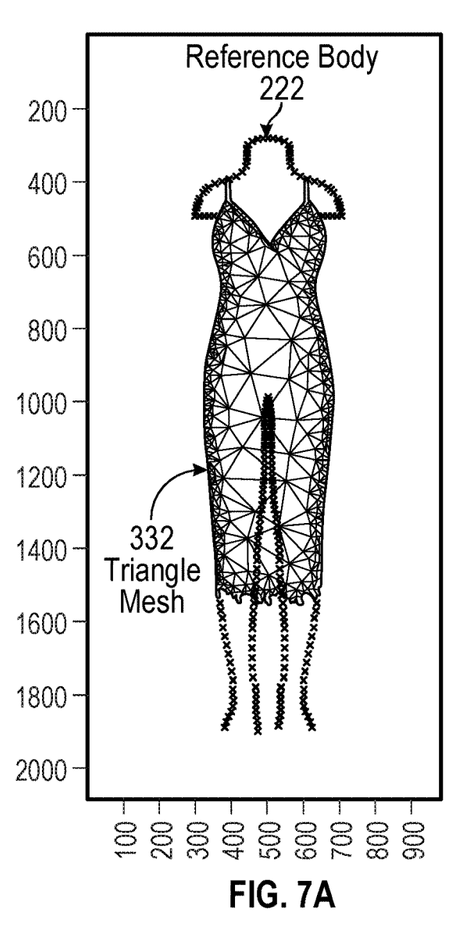
FIG. 7A illustrates a triangle mesh on a reference body in an example embodiment.
Figure 7B:
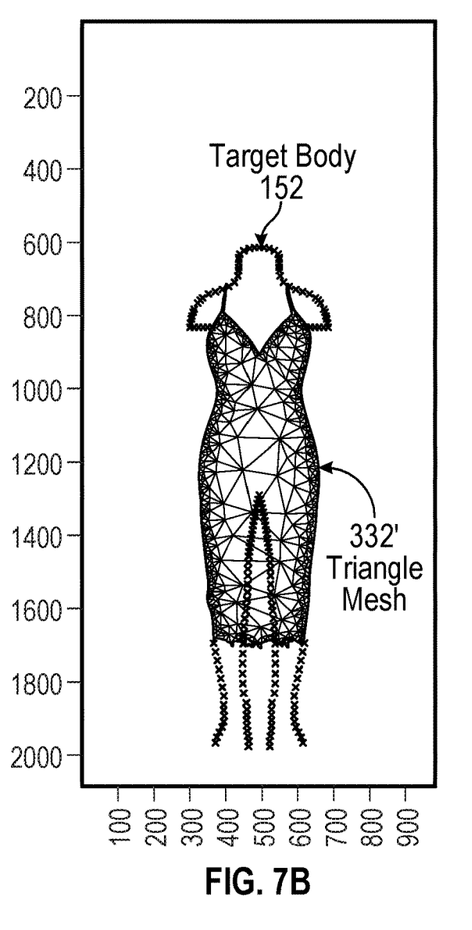
FIG. 7B illustrates an initial deformed triangle mesh on a target body before the deformed triangle mesh internal triangle geometry is restored.
Figure 7C:
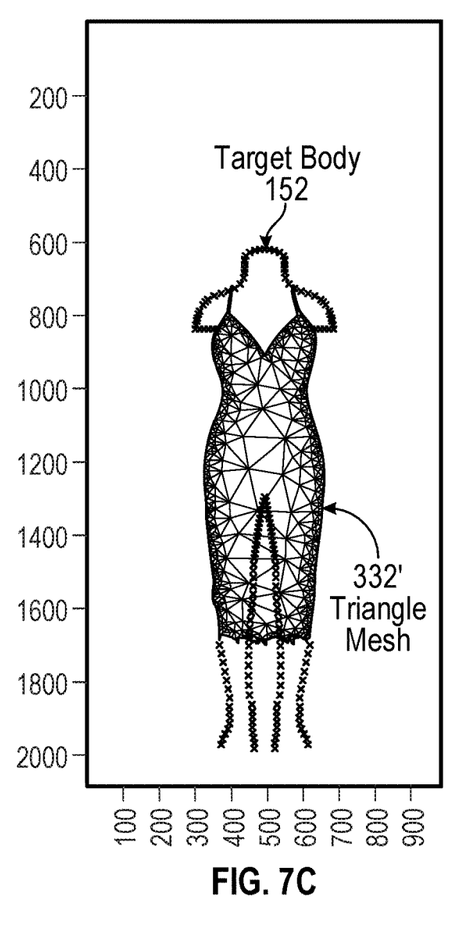
FIG. 7C illustrates a deformed triangle mesh on a target body after substantial restoration to the initial internal triangle geometry of a reference wearable item.

FIG. 7A shows the triangle mesh 332 on the reference body 222. FIG. 7B shows the triangle mesh 332' on the target body 152 before its internal geometry is restored to that of the triangle mesh 332. FIG. 7C shows the triangle mesh 332' on the target body 152 after its internal geometry is restored to that of the triangle mesh 332.

Figure 8A:
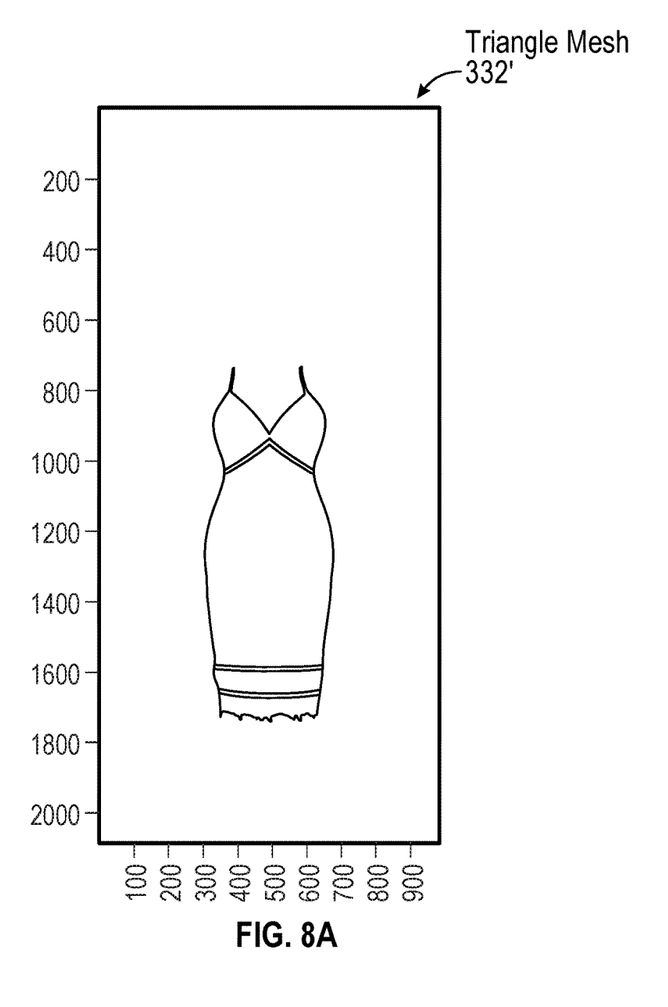
FIG. 8A illustrates a deformed triangle mesh after texture mapping in an example embodiment.
Figure 8B:
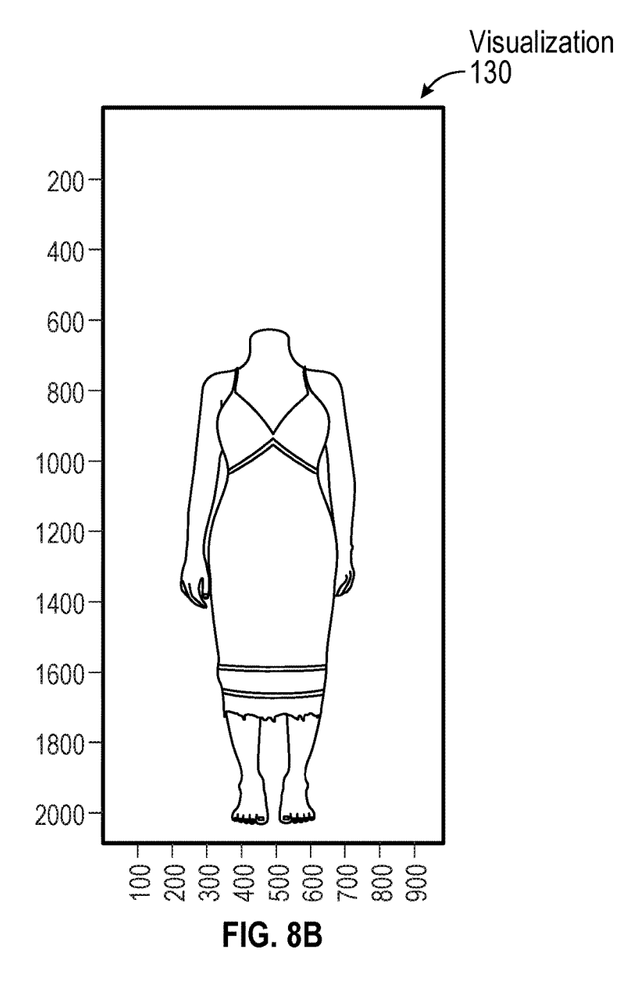
FIG. 8B illustrates a final visualization of a wearable item on a target body after post-processing.

FIG. 8A shows the triangle mesh 332' after its internal geometry is restored to that of the triangle mesh 332 and after texture mapping. In one or more embodiments, the image adapter 118 performs post-processing on the texture mapped data, e.g., by filling extraneous pixel holes, cleaning jagged edges. For example, jagged edges can be cleaned by converting the alpha channel to vectors to obtain a smoothed boundary. A flood fill method can be used to extend the item image data to the boundary of the image based on the original alpha channel. A set of cropping and anchor data can be used to obtain a smaller representation with additional compression. FIG. 8B shows the final visualization 130 after post-processing.

Figure 9:
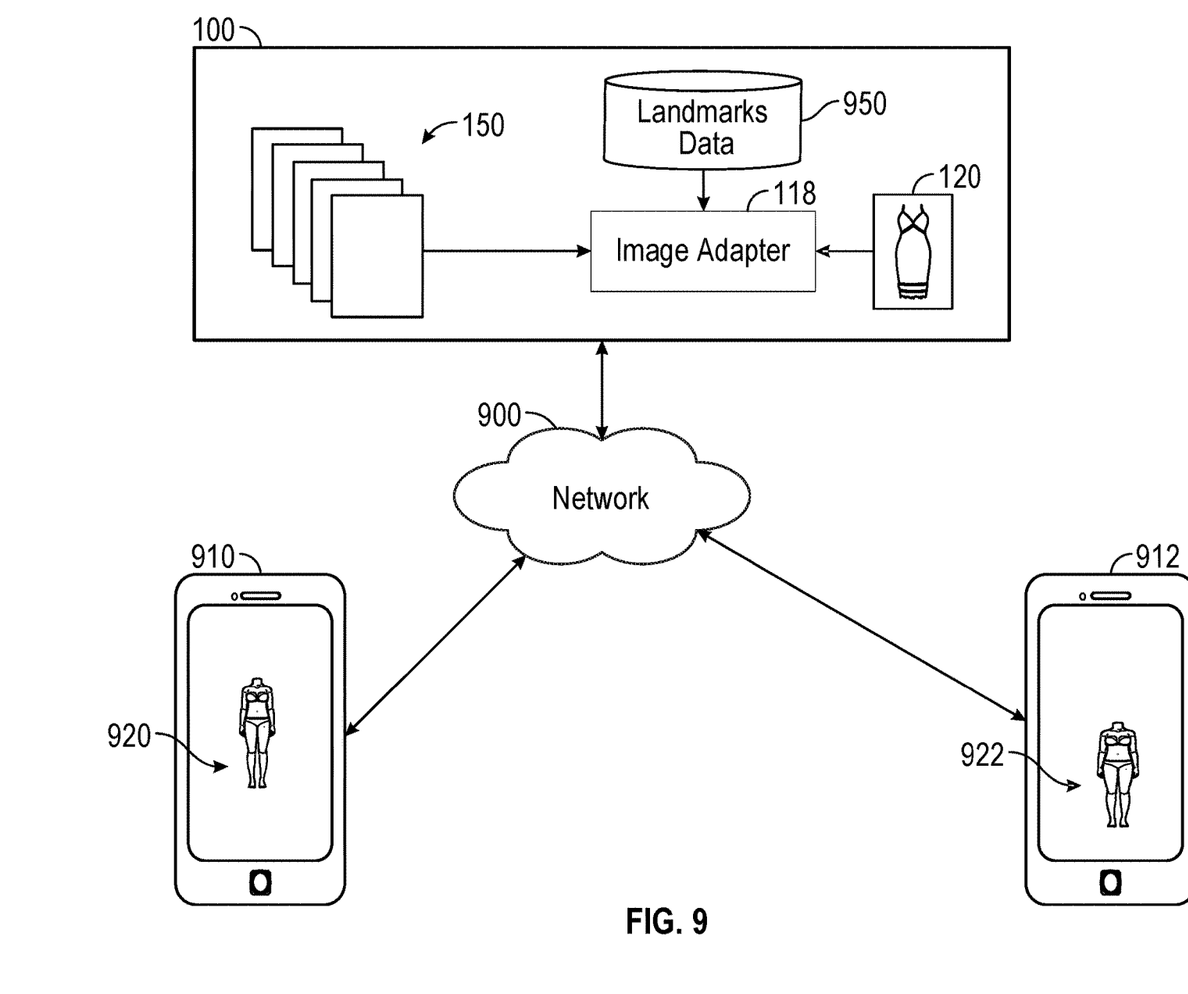
FIG. 9 illustrates how different users can visualize the same wearable item on different target bodies from their respective mobile device.

FIG. 9 illustrates how different users can visualize the wearable item 120 on different target bodies from their respective mobile device 910-912. In this example, the mobile device 910-912 access the wearable item visualizer 100 via a network 900 using web protocols.

In this example, a user of the mobile device 910 browses the available target bodies 150 using the mobile device 910, e.g., using a mobile app adapted for accessing the wearable item visualizer 100, or a mobile web browser app, and selects a taller thinner target body while a user of the mobile device 912 selects a shorter wider target body.

The wearable item visualizer 100 includes a data store containing a set of landmarks data 950. The landmarks data 950 can include target body landmarks for each of the available target bodies 150 along with reference body landmarks and wearable item landmarks. The pre-stored landmarks enable the wearable item visualizer 100 in real-time to construct respective visualizations 920-922 of the wearable item 120 on the respective target bodies chosen by the respective users of the mobile devices 910-912.

Figure 10:
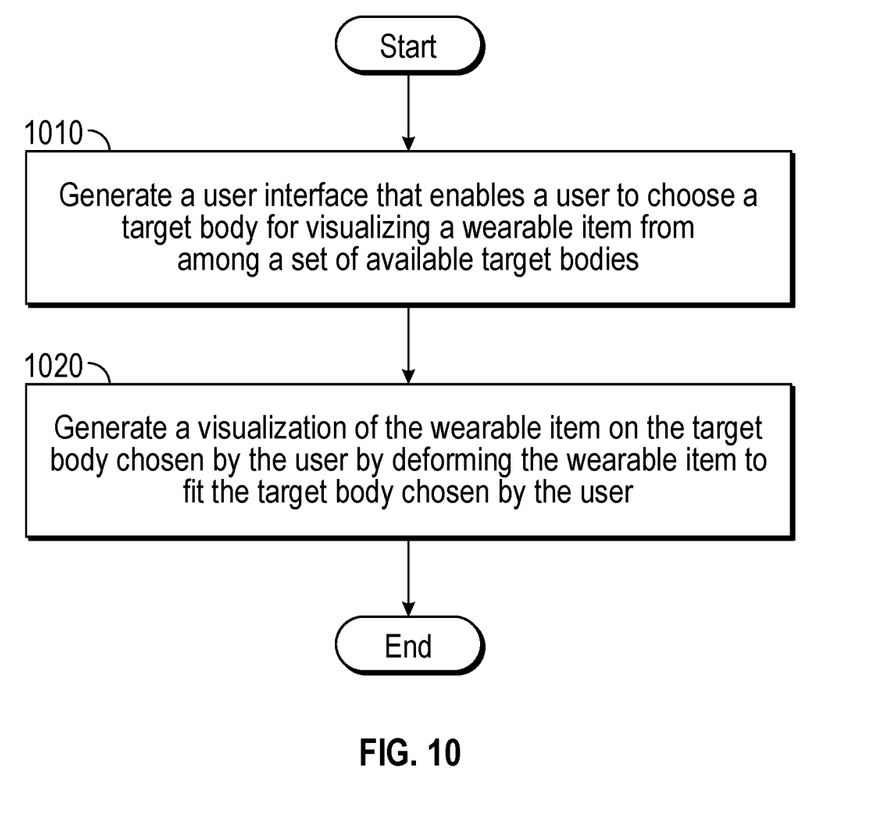
FIG. 10 illustrates a method for visualizing a wearable item in one or more embodiments.

FIG. 10 illustrates a method for visualizing a wearable item in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 10 should not be construed as limiting the scope of the invention.

At step 1010, a user interface is generated that enables a user to choose a target body for visualizing a wearable item from among a set of available bodies. The target bodies can include variations of a reference body for the wearable item. A user interface can enable a user to browse, search, the available target bodies and select them individually.

At step 1020, a visualization is generated of the wearable item on the target body chosen by the user by deforming the wearable item to fit the target body chosen by the user. Deforming the wearable item can include generating a triangle mesh for the wearable item and deforming the triangle mesh to fit the target body chosen by the user. Deforming the wearable item can include restoring an internal geometry of the triangle mesh.

Figure 11:
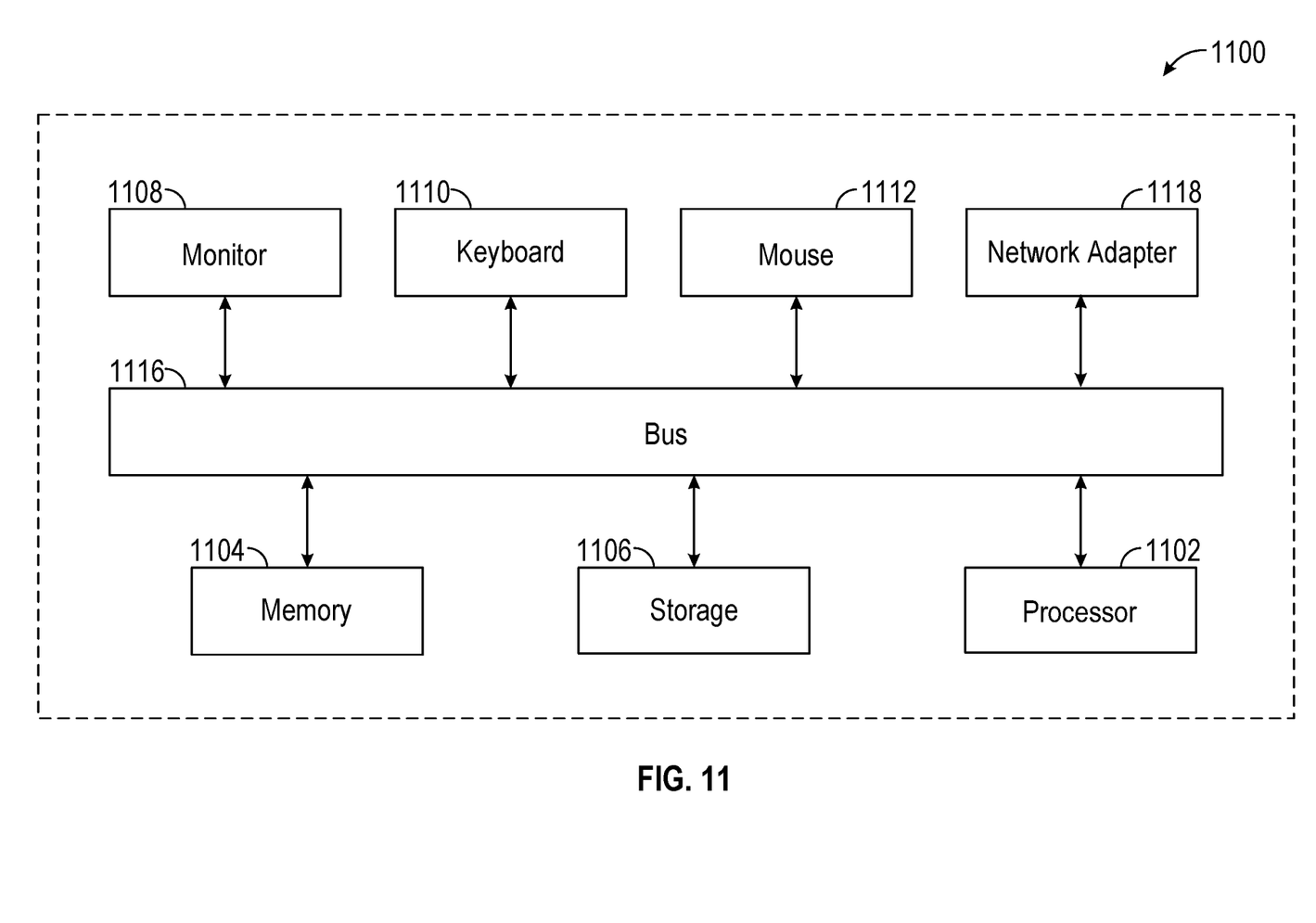
FIG. 11 illustrates a computing system upon which portions of a wearable item visualizer can be implemented.

FIG. 11 illustrates a computing system 1100 upon which portions of the wearable item visualizer 100 can be implemented. The computing system 1100 includes one or more computer processor(s) 1102, associated memory 1104 (e.g., random access memory (RAM), cache memory, flash memory, etc.), one or more storage device(s) 1106 (e.g., a hard disk, an optical drive such as a compact disk (CD) drive or digital versatile disk (DVD) drive, a flash memory stick, etc.), a bus 1116, and numerous other elements and functionalities. The computer processor(s) 1102 may be an integrated circuit for processing instructions. For example, the computer processor(s) may be one or more cores or micro-cores of a processor. The computing system 1100 may also include one or more input device(s), e.g., a touchscreen, keyboard 1110, mouse 1112, microphone, touchpad, electronic pen, or any other type of input device. Further, the computing system 1100 may include one or more monitor device(s) 1108, such as a screen (e.g., a liquid crystal display (LCD), a plasma display, touchscreen, cathode ray tube (CRT) monitor, projector, or other display device), external storage, input for an electric instrument, or any other output device. The computing system 1100 may be connected to a network (e.g., a local area network (LAN), a wide area network (WAN) such as the Internet, mobile network, or any other type of network) via a network adapter 1118.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A wearable item visualizer, comprising:
a landmarks store that holds a target body landmark specifying a location on a target body of a feature of a reference body corresponding to a landmark on a wearable item such that the target body landmark is determined by fitting the wearable item to the reference body and then determining a location on the reference body that corresponds to the feature and the landmark on the wearable item and then determining the location on the target body that corresponds to the location on the reference body;
a user interface mechanism that enables a user to browse and select the target body from among a set of available target bodies for visualizing the wearable item; and
a computing mechanism that generates a visualization of the wearable item on the target body by adapting the wearable item to fit the target body in response to the target body landmark.

2. The wearable item visualizer of claim 1, wherein the target body depicts a variation from a human body type depicted by the reference body.

3. The wearable item visualizer of claim 2, wherein the variation is based on a variation in at least one dimension of at least one part the human body type depicted by the reference body.

4. The wearable item visualizer of claim 1, wherein the computing mechanism adapts the wearable item to fit the target body by deforming the wearable item in response to the target body landmark.

5. The wearable item visualizer of claim 4, wherein the computing mechanism deforms the wearable item by generating a triangle mesh for the wearable item and deforming the triangle mesh to fit the target body.

6. The wearable item visualizer of claim 5, wherein the computing mechanism adapts a set of image data from the triangle mesh for the wearable item before deformation to the triangle mesh after deformation.

7. The wearable item visualizer of claim 1, wherein the available target bodies depict a variety of animals.

8. The wearable item visualizer of claim 1, wherein the available target bodies depict a variety of inanimate objects.

9. A method for visualizing a wearable item, comprising:
storing a target body landmark specifying a location on a target body of a feature of a reference body corresponding to a landmark on a wearable item such that the target body landmark is determined by fitting the wearable item to the reference body and then determining a location on the reference body that corresponds to the feature and the landmark on the wearable item and then determining the location on the target body that corresponds to the location on the reference body;
generating a user interface that enables a user to browse and select the target body from among a set of available target bodies for visualizing the wearable item; and
generating a visualization of the wearable item on the target body by adapting the wearable item to fit the target body in response to the target body landmark.

10. The method of claim 9, wherein generating a user interface comprises depicting a variety of body types of a human body.

11. The method of claim 10, wherein generating a user interface comprises modifying at least one dimension of at least one part of a human body depicted by the reference body.

12. The method of claim 9, wherein generating a visualization comprises deforming the wearable item in response to the target body landmark.

13. The method of claim 12, wherein deforming comprises generating a triangle mesh for the wearable item and deforming the triangle mesh in response to the target body landmark.

14. The method of claim 13, further comprising adapting a set of image data from the triangle mesh for the wearable item before deformation to the triangle mesh after deformation.

15. The method of claim 9, wherein generating a user interface comprises depicting a variety of animals.

16. The method of claim 9, wherein generating a user interface comprises depicting a variety of inanimate objects.

* * * * *